US007370279B2

(12) United States Patent
Sugimoto

(10) Patent No.: US 7,370,279 B2
(45) Date of Patent: May 6, 2008

(54) HOMEPAGE CREATION AND UPDATE PROGRAM

(75) Inventor: Mika Sugimoto, Asaka (JP)

(73) Assignee: Fujifilm Corporation, Tokyo (JP)

( * ) Notice: Subject to any disclaimer, the term of this patent is extended or adjusted under 35 U.S.C. 154(b) by 448 days.

(21) Appl. No.: 09/994,846

(22) Filed: Nov. 28, 2001

(65) Prior Publication Data

US 2002/0063736 A1 May 30, 2002

(30) Foreign Application Priority Data

Nov. 29, 2000  (JP)  ............................. 2000-362926

(51) Int. Cl.
 *G06F 3/00* (2006.01)
 *G06F 7/00* (2006.01)
(52) U.S. Cl. .................... 715/760; 715/762; 707/104.1
(58) Field of Classification Search ................ 345/762, 345/760, 763; 707/100, 104.1; 715/760, 715/762
 See application file for complete search history.

(56) References Cited

U.S. PATENT DOCUMENTS

| | | | | |
|---|---|---|---|---|
| 5,926,210 A | * | 7/1999 | Hackett et al. | ............. 348/158 |
| 5,945,989 A | * | 8/1999 | Freishtat et al. | ............ 345/760 |
| 5,956,736 A | | 9/1999 | Hanson et al. | |
| 6,009,441 A | * | 12/1999 | Mathieu et al. | ............. 715/516 |
| 6,085,195 A | | 7/2000 | Hoyt et al. | |
| 6,189,019 B1 | * | 2/2001 | Blumer et al. | ............... 715/513 |
| 6,275,829 B1 | * | 8/2001 | Angiulo et al. | .......... 707/104.1 |
| 6,493,733 B1 | * | 12/2002 | Pollack et al. | ............... 715/513 |
| 6,578,078 B1 | * | 6/2003 | Smith et al. | ................ 709/224 |
| 6,684,369 B1 | * | 1/2004 | Bernardo et al. | ............ 715/513 |
| 6,812,962 B1 | * | 11/2004 | Fredlund et al. | ......... 348/231.2 |
| 2001/0040625 A1 | * | 11/2001 | Okada et al. | ................ 348/207 |
| 2002/0005866 A1 | * | 1/2002 | Gorham et al. | ............. 345/760 |

FOREIGN PATENT DOCUMENTS

| | | |
|---|---|---|
| JP | 09-237274 | 9/1997 |
| JP | 10-283281 | 10/1998 |
| JP | 10-301923 | 11/1998 |

(Continued)

OTHER PUBLICATIONS

Parker, Elisabeth. "The Complete Idiot's Guide to Microsoft FrontPage 2000", 1999, Alpha Books.*

(Continued)

*Primary Examiner*—John Cabeca
*Assistant Examiner*—Ting Zhou
(74) *Attorney, Agent, or Firm*—McGinn IP Law Group, PLLC

(57) ABSTRACT

The homepage creation and update program allows the user to perform only selection of desired images and indication of beginning of homepage creation process to automatically create a homepage easily. The homepage creation and update program possesses a function of displaying plural stored images and allowing the user to select desired images, a function of allowing the user to indicate beginning of the homepage creation process, and a function of automatically creating or updating a homepage using the selected images after the user selects desired images and then indicates beginning of the homepage creation process. The homepage creation and update program allow a computer to execute these functions, so that the user performs only selection of desired images and indication of homepage creation to acquire an automatically or semiautomatically created or updated homepage.

30 Claims, 12 Drawing Sheets

FOREIGN PATENT DOCUMENTS

| | | |
|---|---|---|
| JP | 10-341303 | 12/1998 |
| JP | 11-004311 | 1/1999 |
| JP | 11-265390 | 9/1999 |
| JP | 2000-222325 | 8/2000 |
| JP | 2000-278550 | 10/2000 |

OTHER PUBLICATIONS

Parker, Elisabeth. "The Complete Idiot's Guide To Microsoft FrontPage 2000". Alpha Books, 1999.*

Japanese Office Action dated Mar. 14, 2007 (with partial English translation).

Hiroki Anbiru, "Mac People, a freeware by Adobe offering a new amusement to all digital camera fans", Japan, ASCII Corp., Jun. 1, 2000, vol. 6, No. 11, p. 100-101.

European Search Report dated Mar. 31, 2003.

Japanese Decision of Final Rejection dated Jan. 24, 2008 (with English translation).

* cited by examiner

FIG.10

```
<HTML>
<HEAD>
<TITLE>Pix GUI Builder</TITLE>
<!-- Click an image to open a new window-->
<SCRIPT LANGUAGE"=JavaScript">
<!--
var cart_win;
function wopenl(url) {
if (cart_win=null || cart_win.closed){
cart_win=window.open(url,"_detail",
"width=600,height=600,scrollbars=yes,toolbar=no,location=no,directories=no,status=yes,menubar=no
");
} else {
cart_win.location.href=url;
cart_win.focus();
}
}
//-->
</SCRIPT>

</HEAD>
<BODY text="navy" bgcolor="Linen">
<CENTER>
<table BORDER="0" cellspacing="20" cellpadding="10" bgcolor="white">
<TR BGCOLOR="pink">
<TH> Name </TH>
<TH> Contents </TH>
</TR>

<!__ first page __>
<TR>
<TD ALIGN="center">
<A HREF="JavaScript:wopenl('../detail?id=0.0.0.0:87' )">
<img SRC=../server/pixx.GetServer?filter=Thumbnail&id=0.0.0.0:87>
</A>
</TD>
<TD>
May 19th<br>
I went to Hakone, and stayed at a hotel near the lake in the mountains. Of course, there was an outdoor
bath, and I took it three times. It was very pleasant.
</TD>
</TR>

<!__ second page __>
<TR>
<TD ALIGN="center">
<A HREF="JavaScript:wopenl('../detail?id0.0.0.0:94' )">
<img SRC=../server/pixx.GetServer?filter=Thumbnail&id=0.0.0.0:94>
</A>
</TD>
<TD>
May 20th<br>
I went to the Hakone glass mantion. There are some exhibits, such as overseas glass history, and I studied
about glass. I wanted to buy a Venetian glass,but I bought nothing because it is very expensive and I could not
find a favorite one. But I wanted to make a piece of glasswork.
</TD>
</TR>

</TABLE>
</CENTER>
</BODY>
</HTML>
```

Additional part

HOMEPAGE CREATION AND UPDATE PROGRAM

BACKGROUND OF THE INVENTION

1. Field of the Invention

The present invention relates to a homepage creation and update program, and more particularly to a homepage creation and update program capable of automatically or semiautomatically creating or updating homepages easily.

2. Description of the Related Art

In the past, when operating a personal computer to create a desired homepage, users have been required to have a knowledge of JavaScript, HTML language or the like for homepage creation. Therefore, it is not easy for users to create or update their homepages. Recently, software to aid in homepage creation is released, allowing limited users to create their homepages and open them in a network.

However, even if users employ conventional software to aid in homepage creation, there remain difficulties in operation from starting up a homepage creation software system to creating a homepage, and a large number of steps from completion to registration of a homepage. For these reasons, common users have not been able to create their homepages easily.

It is therefore an object of the present invention to provide a homepage creation and update program, which does not require a knowledge of HTML, and are capable of automatically or semiautomatically creating or updating homepages, allowing users to only select desired images and indicate homepage creation on an image viewer screen, which displays plural image files and buttons indicating uses of the image files.

SUMMARY OF THE INVENTION

In order to solve the above-mentioned problems, the present invention provides a homepage creation and update program, which causes plural image files to be displayed and allows a user to select desired images and to indicate homepage creation or update using the images. The present invention is directed to a homepage creation and update program causing a computer to execute the following functions of: displaying plural stored images and allowing the user to select desired images; allowing the user to indicate beginning of homepage creation process; and automatically creating or updating a homepage using the selected images after desired images are selected and beginning of homepage creation process is indicated by the user.

The present invention is also directed to a homepage creation and update program according to the present invention causing a computer to perform the following functions of: displaying plural stored images, and allowing a user to select desired images; allowing the user to indicate beginning of homepage creation process; and automatically creating or updating a homepage using the selected image after selects desired images are selected and beginning of homepage creation process is indicated by the user.

Therefore, by only selecting desired images and indicating homepage creation by the user, a homepage can be automatically or semiautomatically created or updated.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 10 illustrates an exemplar description of the HTML file of a created homepage;

DETAILED DESCRIPTION OF THE PREFERRED EMBODIMENTS

Preferred embodiments will be described in detail of a homepage creation and update program according to the present invention in reference to the accompanying drawings.

Figure 1:
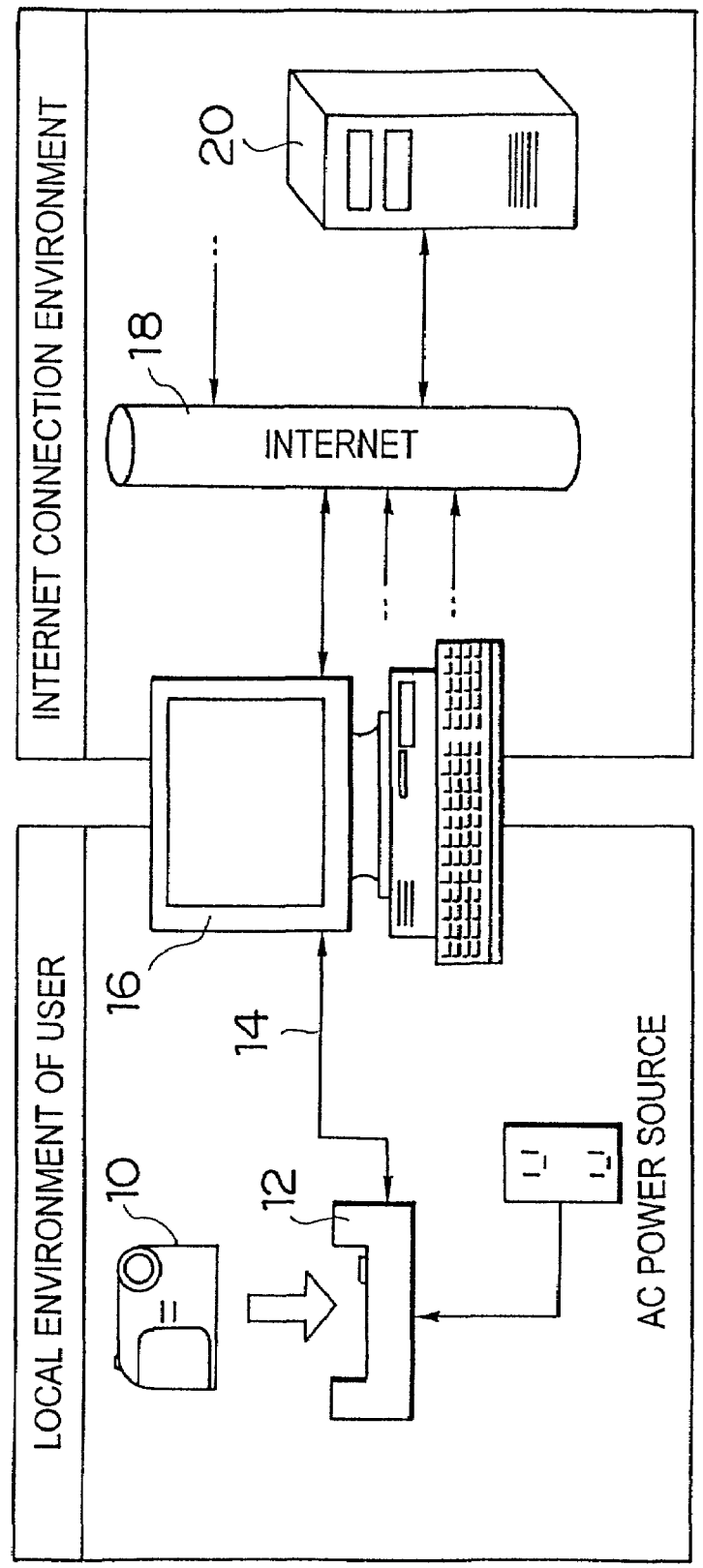
FIG. 1 illustrates configuration and connection of an image service system.

FIG. 1 illustrates configuration and connection of an image service system.

With reference to FIG. 1, the image service system is constituted of an electronic camera 10, a cradle 12, a personal computer 16, and a service center 20. The electronic camera 10 stores user-defined information, which is set by a user, and images, and transmits the stored information to other communication devices. The cradle 12 is a relay device, which communicates with a communication device of the electronic camera 10 and supplies power to the electronic camera 10. The personal computer 16 is a communication device, which sends or receives information, such as images, to or from the cradle 12 via a communication device 14, such as USB (Universal Serial Bus). In addition, the personal computer 16 also sends or receives information, such as images, to or from a server or a service center via a network. The service center 20 is a server, which sends or receives information including images, voice data, and homepages to or from other devices via a communication network, such as the Internet 18.

With such a service system, the personal computer 16 can send or receive information including service menus, homepages, and images to or from the service center 20. The electronic camera 10 possesses at least an imaging device, a storage device to store images and voice data, and a communication device to send or receive information to or from other communication devices.

The personal computer 16 is provided with a communication device to send or receive information to or from the electronic camera 10, a communication device to send or receive information to or from a communication network, such as the Internet 18. In addition, the personal computer 16 is also provided with a display device to display an image viewer, screens of homepage creation and update, and information including service menus, which are provided by each service center 20, 20 . . . , to the user. Furthermore, the personal computer 16 possesses a selector for users to select desired images or voice data from identification information concerning the displayed images or voice data, and a selector (including a function of indicating to begin homepage creation process) to select a desired homepage creation and update processing, each service or a homepage from information, which includes the displayed service menus. The personal computer 16 is also provided with a storage device to store execution program and information including images and voice data.

In addition, the personal computer 16 is set so that image viewer software is started up. The image viewer software possesses functions of an image viewer, which allows the display device in the personal computer 16 to display images stored in the storage device built in the personal computer 16, an external storage device connected to the personal computer 16, or the storage device of the electronic camera 10, and an indicator to indicate uses of the displayed images.

The server including the service center 20 is provided with a communication device to send or receive various types of information to or from a communication network, such as the Internet 18, and a storage device to store information, which includes index files. The index files contain user-defined information, usage information, service menu information to be provided to users, passwords, payment methods for usage fee, which is paid by users of the electronic camera 10, homepage information received from a user's personal computer 16, and link information concerning the homepage. Furthermore, the server possesses a device to determine display priority of plural services to be provided to users according to users' service usage information.

Figure 2:
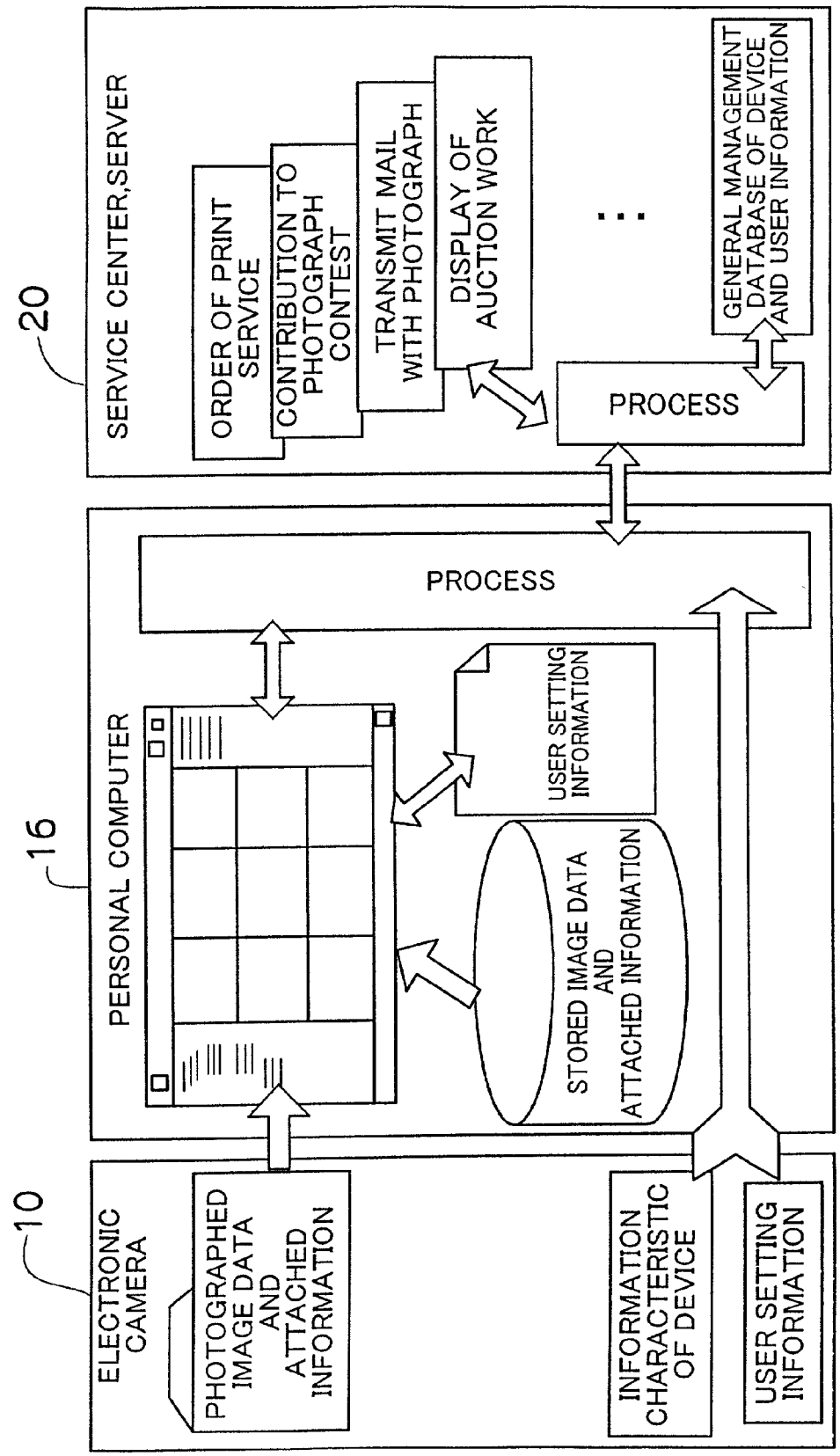
FIG. 2 illustrates a flow of information sent and received among an electronic camera, a personal computer, and a service center.

FIG. 2 illustrates a flow of information, which is sent and received between the electronic camera and the service center.

As shown in FIG. 2, the electronic camera 10 transmits photographed image data and its incidental information, identification information, which is intrinsic to the electronic camera 10, user-defined information, which can be customized by the user, such as address and credit card number, to the personal computer 16 via the communication device 14.

When the electronic camera 10 is mounted on the cradle 12, the personal computer 16 automatically detects (using Plug & Play function) connection of the electronic camera 10 via a communication device, such as USB. Subsequently, images, which are stored in the electronic camera 10, are displayed, and then an image viewer that is application software, in which the user indicates uses of the images, is automatically started up.

As an example of automatic detection function of detecting connection of the electronic camera 10, a device driver, which automatically detects connection of the electronic camera 10 when or after a system program in the personal computer 16 is started up, is installed in advance to monitor Plug & Play events in the communication system. When the device driver recognizes connection of the electronic camera 10, processing program, such as an image viewer, are started up according to a processing mode in the electronic camera 10.

Figure 3:
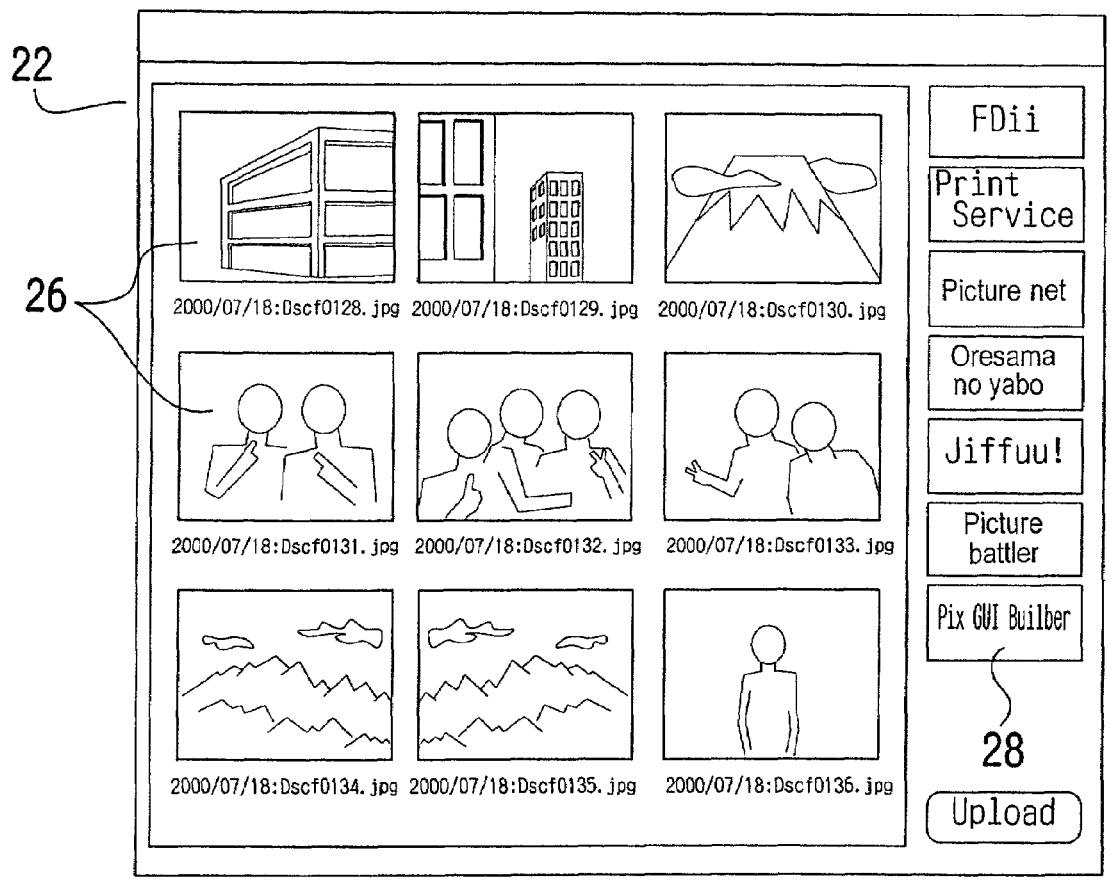
FIG. 3 illustrates a display screen of an image viewer displayed on a display device of the personal computer.

FIG. 3 illustrates a display screen (which displays plural image files and buttons for uses of the image files) of an image viewer displayed on the display device of the personal computer.

A display screen 22 displayed by the image viewer includes a file list and a series of compact images (including thumbnail images) 26, 26 . . . for original pictures, which are stored in a folder selected by the user, on the left side. In addition, one or plural buttons 28, 28 . . . for service menus, such as automatic homepage creation and image print service, and for selection of execution or beginning of each service are displayed on the right side.

Furthermore, if information stored in an indicated folder contains only voice data, only a service menu provided by the service center 20, such as a music site concerning voice data, is displayed. On the other hand, if information stored in an indicated folder contains only images or the electronic camera 10 does not possess a function of reproducing voice data, only a service menu concerning images is displayed. In this way, unnecessary information is not displayed, so that selection items are reduced for users and users can easily operate the image viewer.

The user selects one or plural images from the displayed compact images 26, 26 . . . using input devices, such as pointing devices including a mouse or a keyboard, and then pushes the buttons 28, 28 . . . (including print service buttons, which are provided according to price, quality, and delivery data, photo CD creation service button, photograph open button, photo contest application button, auction site transmission button, display button for cellular phone, automatic or semiautomatic homepage creation button) to indicate execution of each service. As a result, the user can receive a desired image service and perform automatic or semiautomatic homepage creation.

The images and voice data selected in the above-mentioned way and the information concerning service to be executed at the service center 20 are linked in application program of the image viewer. Subsequently, the linked data is transmitted to a destination, such as a homepage of the service center 20, indicated by the buttons 28. If the personal computer 16 and a provider of the Internet or other networks are connected via a public telephone line, and the user selects and indicates images, voice data, and the service center 20, the personal computer 16 performs dial-up to begin communication with the provider. Then, information concerning IP addresses or domain names assigned to the service center 20 and the personal computer 16, the desired service information, the selected images and voice data, and the user identification information are transmitted at the same time.

The service center 20 receives the IP address or domain name of the personal computer 16, which is an original sender, the service information, the images and voice data, the user identification information, and authentication information, such as password. Then, the service center 20 transmits the received operating screen information to the personal computer 16.

When receiving the user identification information and password from the user, the server reads the password stored in a storage device, which is linked to user information in advance, and then a comparator compares the password inputted by the user with one stored in the storage device.

If the comparator determines that the password inputted by the user is the same as one stored in the storage device, the server permits and executes distribution of the images or voice data, and printed matters requested by the user, or services, such as homepage registration and update. The address information for commerce distribution is included in the user-defined information, which is stored in the storage device linked to user identification information and contains distribution address information.

In addition, if the payment method for usage fee of each service, which is provided by the service center 20, is included in the user-defined information, the payment method for usage fee contained in the user-defined information is automatically selected. Then, the service center 20 receives the usage fee according to the payment method and the comparison result of password.

Figure 4:
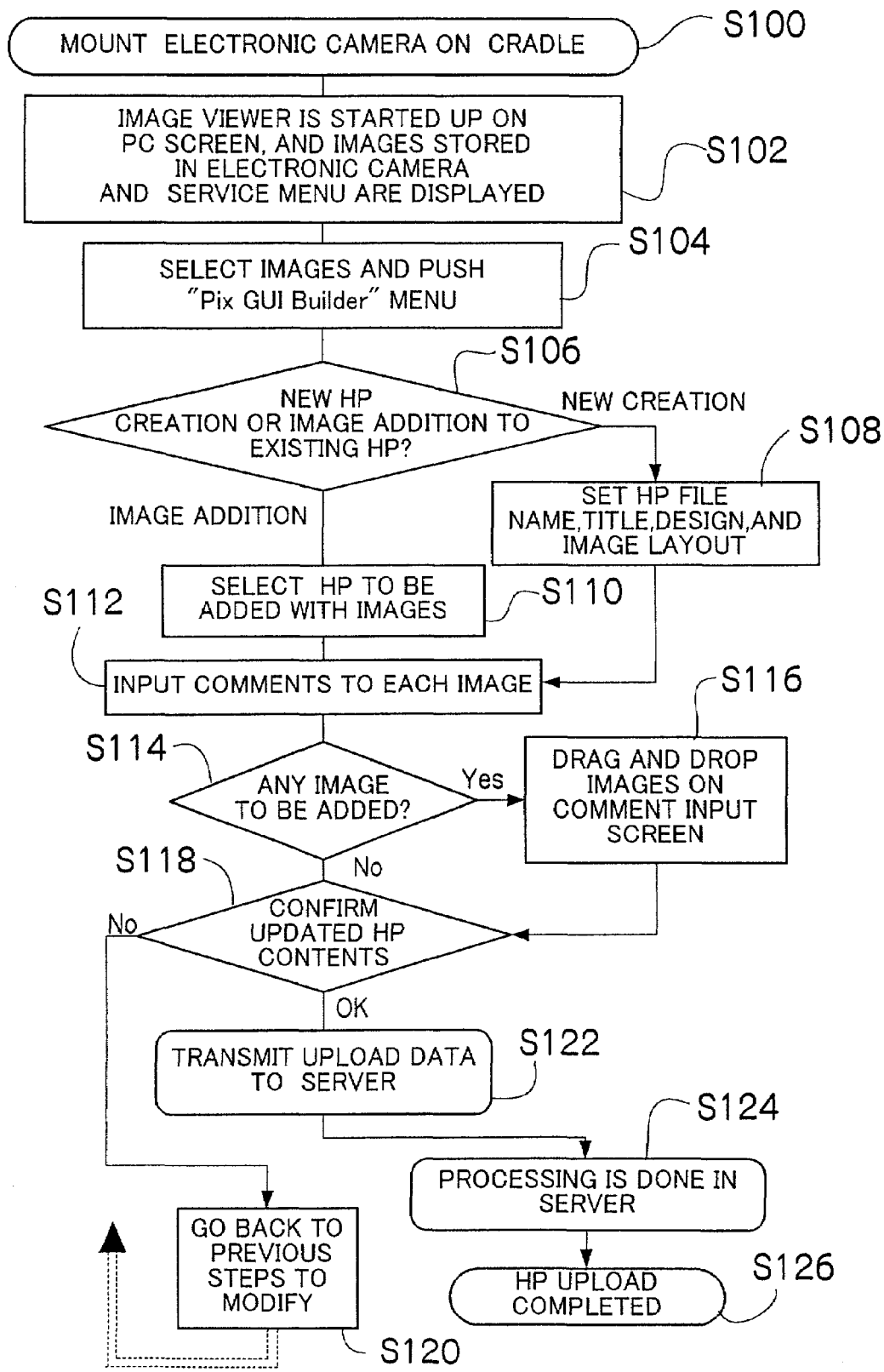
FIG. 4 illustrates a flow chart of start-up of the image viewer, and a homepage creation and update program.

FIG. 4 illustrates a flow chart of start-up of an image viewer, and homepage creation and update processing program.

When the electronic camera 10 is connected to the cradle 12, the image viewer is automatically started up. Alternatively, when the electronic camera 10 is not connected, the image viewer may be started up by user's operation of an input device connected with the personal computer 16.

At Step S100 "mount an electronic camera on a cradle" (hereinafter described as S100), the electronic camera 10 is mounted on the cradle 12 shown in FIG. 1, and then the information that the electronic camera 10 is mounted on the cradle 12 is transmitted to the personal computer 16 via the communication device 14. Subsequently, the image viewer is automatically started up. The image viewer processing program proceeds to Step S102 "an image viewer is started up on a PC screen, and images stored in the electronic camera and a service menu are displayed", and software of the image viewer is started up. The personal computer 16 begins communication with the electronic camera 10 via the communication device 14, and then reads images stored in the storage device of the electronic camera 10 to display a series of the original or compact images on the display screen 22.

When performing homepage creation or update using the images displayed in the image viewer, at Step S104 "select images and push "Pix GUI Builder" menu", the user selects desired images 26, 26 . . . using a pointing device, such as mouse, connected with the input device of the personal computer 16. Furthermore, the user pushes a "Pix GUI Builder" button 28 to select and indicate beginning of automatic homepage creation. Subsequently, a homepage creation and update menu provided in an image insertion wizard (homepage upload wizard) in "Pix GUI Builder" shown in FIG. 5 is displayed.

The software of the image viewer transmits start-up of homepage creation and update program indicated by the user and attributes which specify the indicated image files to the homepage creation and update program using a format, for example, the following format:

"start-up command for a homepage creation and update program"+"image file name 1"+"image file name"+

Figure 5:
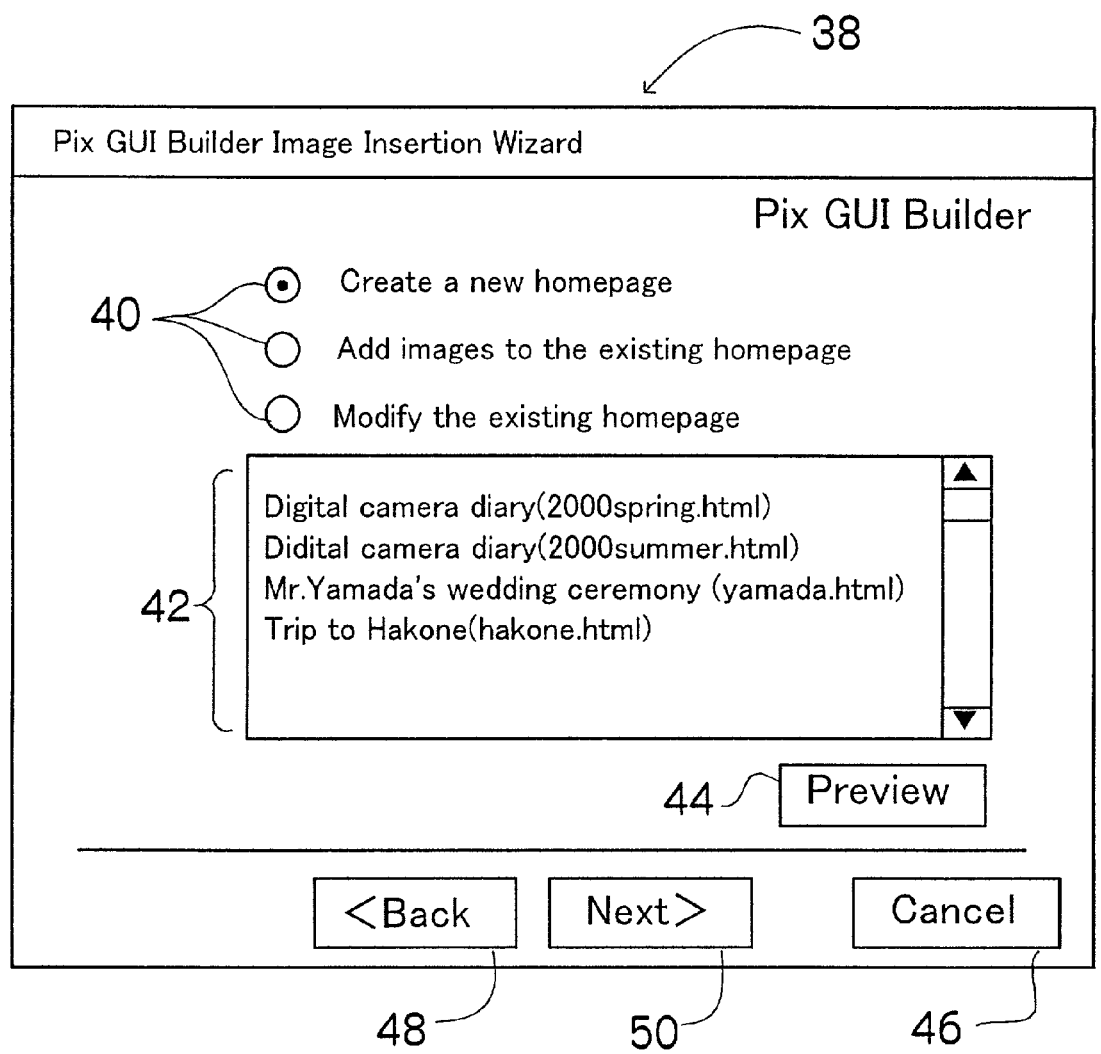
FIG. 5 illustrates a display screen of a homepage creation and update menu.

FIG. 5 illustrates a display screen, which displays a homepage creation menu in the homepage creation and update program.

As shown in FIG. 5, a homepage creation menu 38 is provided with menu buttons 40, which are employed when the user selects and indicates new homepage creation process, image addition process to an existing homepage, and modification (e.g., comment modification) processing for an existing homepage. In addition, the homepage creation menu 38 includes homepage menu 42, preview button 44, back button 48, and next button 50. In the homepage menu 42, each homepage title and file name possessed by the user, which is stored in the personal computer 16 or a server of the service center 20, and linked to the server if required, is displayed. The preview button 44 is employed to request preview of a selected homepage. The back button 48 is employed when returning a current screen to the previous screen of the image viewer, and the next button 50 is employed when moving a current screen to the next screen of the image insertion wizard of "Pix GUI Builder" and to the next processing step.

Next, at Step S106 "a new HP creation or image addition to the existing HP?" shown in FIG. 4, the user selects a desired homepage creation or update menu and a homepage file with reference to the screen of the homepage creation menu 38 shown in FIG. 5, and then selects the next button 50 to proceed to next step. At this point, if the user checks the menu button (selects the menu) of "create a new homepage" or "modify the existing homepage", the process of the homepage creation program proceeds to Step S108 "set HP file name, title, design, and image layout".

Figure 6:
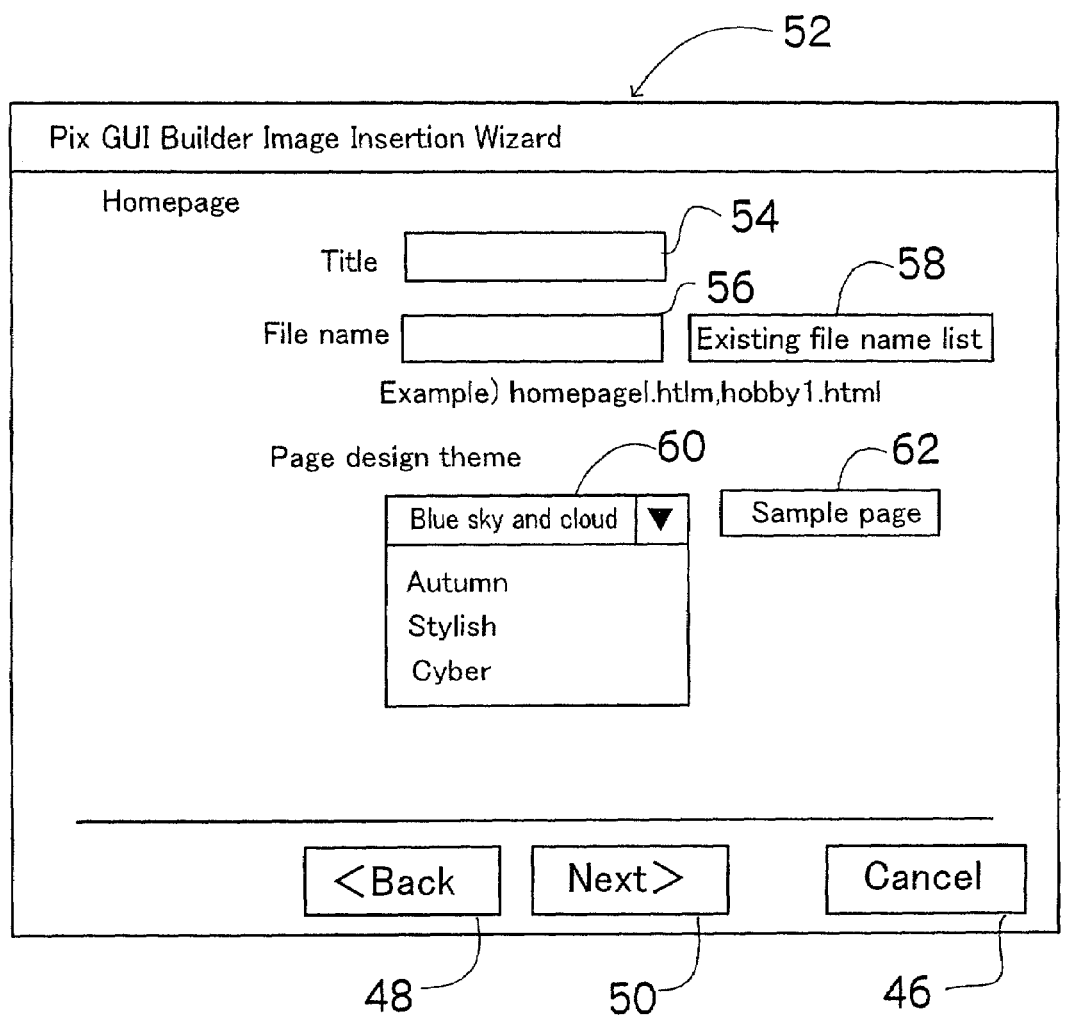
FIG. 6 illustrates an exemplar display of a homepage creation and update screen.

If the process of the homepage creation and update program proceeds to Step S108, the display screen 22 switches to a homepage creation and update screen 52 shown in FIG. 6.

The homepage creation and update screen 52 shown in FIG. 6 is constituted of title box 54, file name box 56, file name list button 58, page design box 60, sample page button 62, cancel button 46, back button 48, and next button 50. The title box 54 and the file name box 65 are employed for inputting the title name and the file name (specifically, the file name of homepage1.html or hobby 1.html) of a homepage to be newly created or updated respectively. The file name list button 58 is employed when the user selects a file name to be inputted to the file name box 56 from existing file names and uses it so that it does not possess the same name as any existing file names. At this point, the file name to be inputted may be modified to avoid using an overlapped name. The page design box 60 is employed for selecting and inputting a design image, such as background image for a homepage to be created or updated. The sample page button 62 is employed to indicate displaying a designed homepage (sample page).

Figure 7:
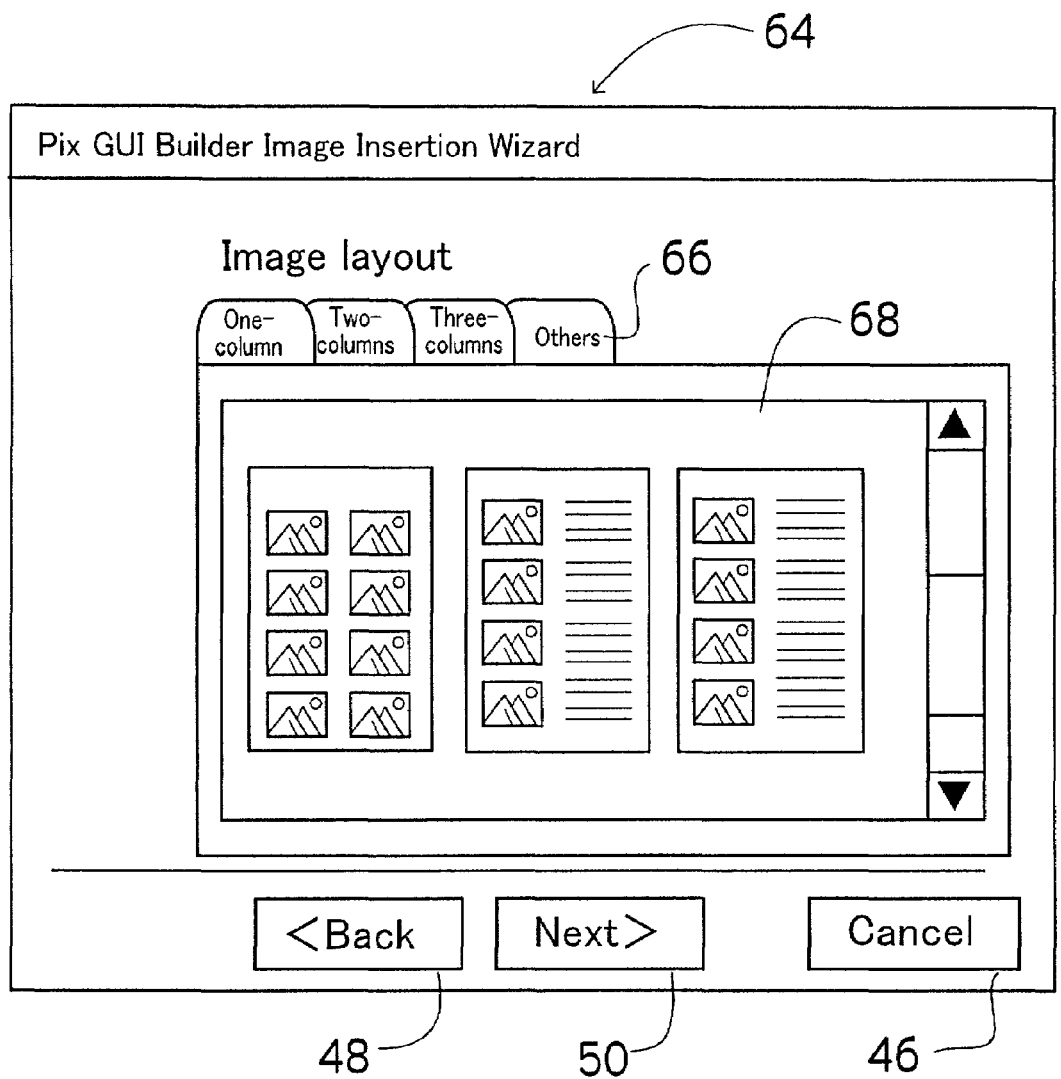
FIG. 7 illustrates an exemplar display of an image layout screen.

At Step S108, after inputting the information on title, file name, and page design for a homepage to be newly created or updated with reference to the items shown in FIG. 6 and pushing the next button 50, the current display screen 22 is switched to a image layout screen 64 shown in FIG. 7.

The image layout screen 64 shown in FIG. 7 is constituted of layout buttons 66, layout display 68, cancel button 46, back button 48, and next button 50. With the layout buttons 66, the user selects a layout including plural images. The layout display 68 is employed to monitor the layout constituted of the selected images.

Alternatively, when arranging images, images may be automatically arranged according to each image information, which is stored in the image file selected by the user, such as image's width, height, direction, resolution, trimming, and zooming. Also, if the image storage format is the Exif format, which is generally employed for image storage, information contained in the tag of the Exif format may be employed as the above-described image information.

In addition, when rearranging images, a homepage display function with screen editor, which is capable of moving an image to a desired position by moving the image to the desired position and then dropping the dragged image and changing image size, such as enlargement or scale-down, may also be provided.

At Step S106, if the user checks the menu button "add an image to the existing homepage" (selects the menu), the process of the homepage creation and update program proceeds to Step S110 "select a HP to be added with images".

At Step S110, if the user selects a file name, which is the file name of a homepage to be added with images, from the homepage menu and pushes the next button 50, the process of the homepage creation program proceeds to Step S112.

Figure 8:
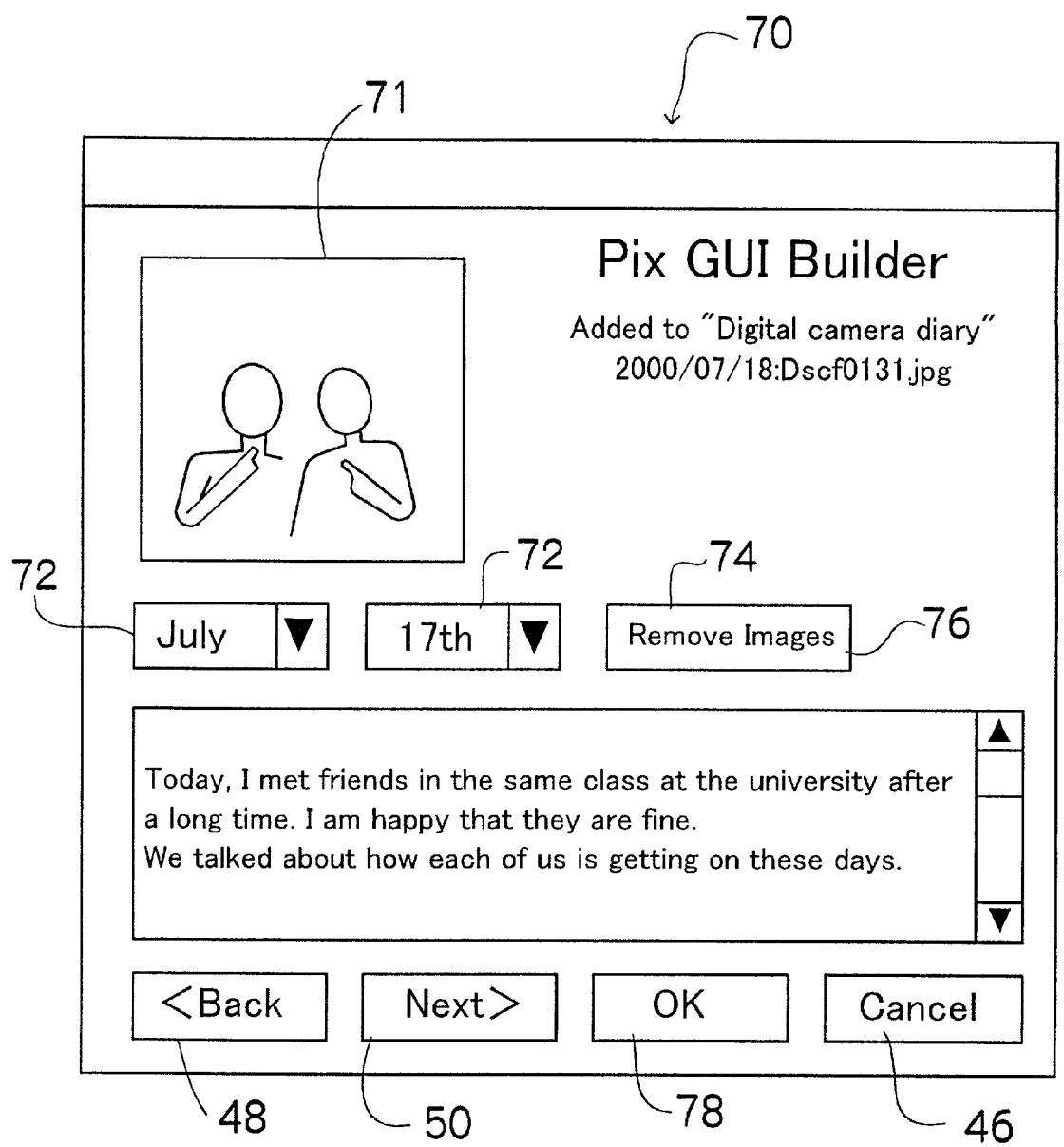
FIG. 8 illustrates an exemplar display of a comment edit.

If the process of the homepage creation and update program proceeds to Step S112, a comment editor 70 shown in FIG. 8 is displayed on the display screen 22. The comment editor 70 shown in FIG. 8 is constituted of an image 71, date box 72, 72, remove button 74, comment space 76, cancel button 46, back button 48, next button 50, and OK button 78. The image 71 is displayed in order of the user's selection when the homepage creation and update program start up. The date box 72, 72 is employed for displaying a default date, which is date and time information stored in the image file when the image is taken, and for changing the date. The remove button 74 is employed to indicate to erase a selected image and its comment from the homepage. In the comment space 76, information, such as title and comment, which is read out from an image file, is displayed. The OK button 78 is employed for confirmation of the image 71 and its comment displayed in the comment editor 70.

Alternatively, besides the time and data, comment, and title of an image, photographing conditions, such as photographer, image width, image height, compression mode of a stored image, shutter speed, contraction value, brightness value, light exposure correction value, minimum stop-down value of lens, object distance, photometry method, flash emission conditions, and photographing location and direction, may be associated and displayed with the image. Also, if the image storage format is the Exif format, the information stored in the tag of the Exif format may be employed as information concerning the photographing conditions.

At Step S112, the user writes a comment for each of the images 71, and performs editing, such as modification. After modifying the comments, the user selects the next button 50, and then images and their comments are displayed on the screen in order of selecting of images at Step S104. The images may be displayed in order of the user's selection or in the reverse order.

If the user wants to add an image other than the selected images at Step S104, he/she indicates image addition at Step S114 "add any images?". Subsequently, the processing program proceeds to Step S116 "drag and drop an image on the comment input screen". On the other hand, if the user does not indicate image addition at Step S114 (the user pushes the OK button to indicate completion of comment editing for all of the images), the processing program proceeds to Step S118 "confirm HP update contents".

At Step S116, the user drags and drops an image from the display screen 22 of the image viewer shown in FIG. 3 in condition that the comment editor 70 is displayed, and then the new image is added. At this point, the user can input a comment on the added image. After completion of the drags and drops operation and comment input, the processing program proceeds to Step S118 "confirm HP update contents".

Figure 9:
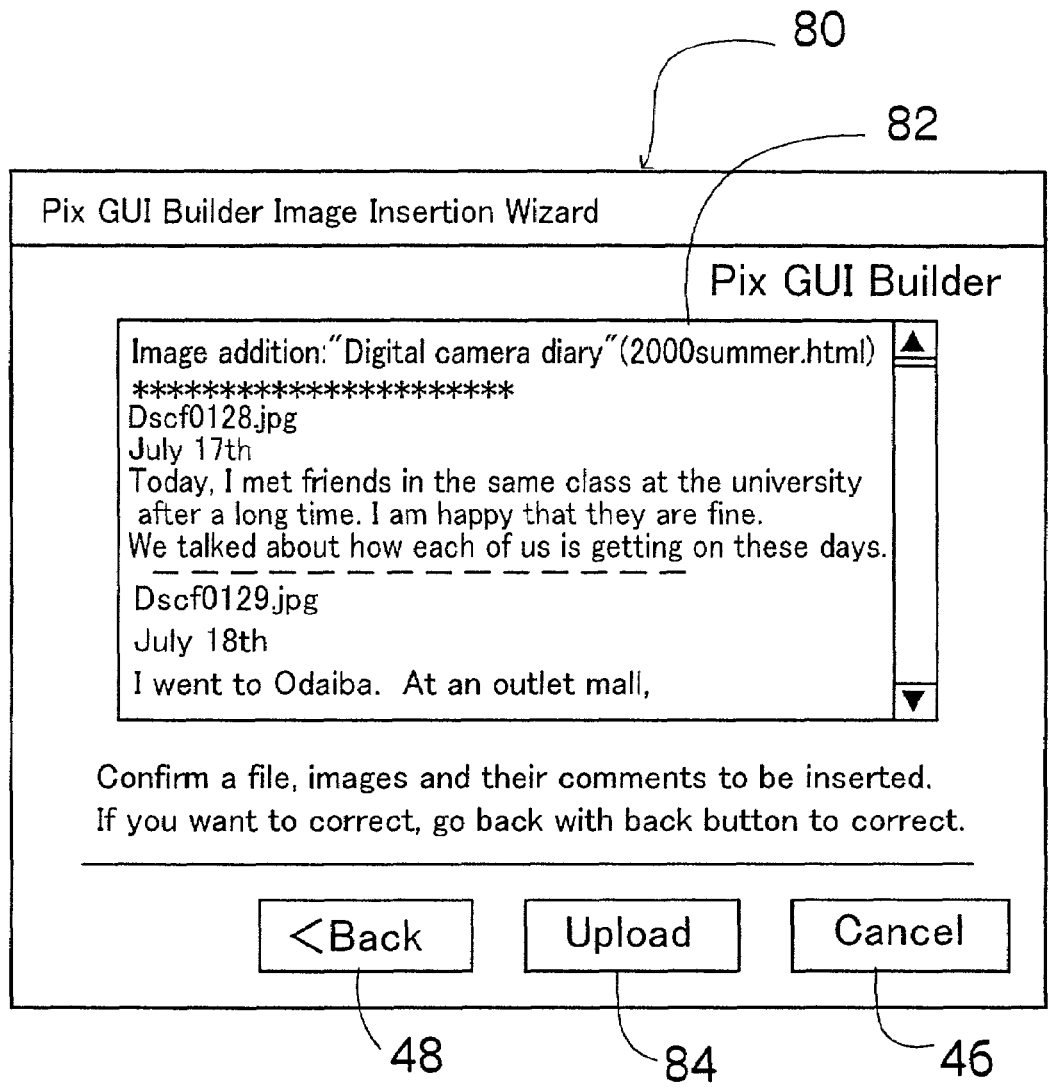
FIG. 9 illustrates a confirmation screen of images and their comments.

At Step S118, since comment editing for all of the images has been completed, an "image/comment confirmation screen" shown in FIG. 9 is displayed. On this screen, the user confirms a homepage, and image files and their comments, which are to be inserted.

FIG. 9 illustrates a confirmation screen for images and their comments, which are to be employed for a homepage.

The image/comment confirmation screen 80 shown in FIG. 9 is constituted of image/comment confirmation space 82, cancel button 46, back button 48, and upload button 84. In the image/comment confirmation space 82, homepage title added with images, indication of image addition, file name of homepage added with images, file name of each image to be displayed in homepage, and comments to be displayed with images are displayed. The upload button 84 is employed to store the file, which contains the edited homepage contents, into the storage device of the personal computer 16 or to upload it to a server at the service center 20 via the Internet 18.

If the user wants to change images and layout, and modify comments in a homepage, the process of the homepage creation and update program proceeds to Step S120 "go back to a previous step to modify contents" and the user performs the process of going back to a desired editing step. If the user selects the upload button 84 at Step S118, the process of the homepage creation and update program proceeds to Step S122 "transmit upload data to a server" to store the file of the created homepage into the storage device of the personal computer 16. Subsequently, communication with a server at the service center 20 is begun to access it.

At Step S124 "perform processing at a server", the file of a homepage created at the personal computer 16 is received, and then stored at a storage device of the server. If a new homepage is created using the homepage creation and update program in the personal computer 16, the file of a new indicated homepage is created. At the same time, selected images and their comments are inserted into the file, and then the file is stored at a specified homepage storage location of a storage device of the server.

If an image is added to the existing homepage file, the edited image and comments are added to the existing homepage file stored in the server and the link part in the index file is updated. Alternatively, the update of the index file may also be modified in the personal computer 16 instead of the server, and then the modified index file may be transmitted to the server.

When completing storage of the homepage file, the process proceeds to Step S126 "completion of HP upload", and then the homepage creation and update program in the personal computer 16 and a series of the processes at the server are completed.

Figure 11:
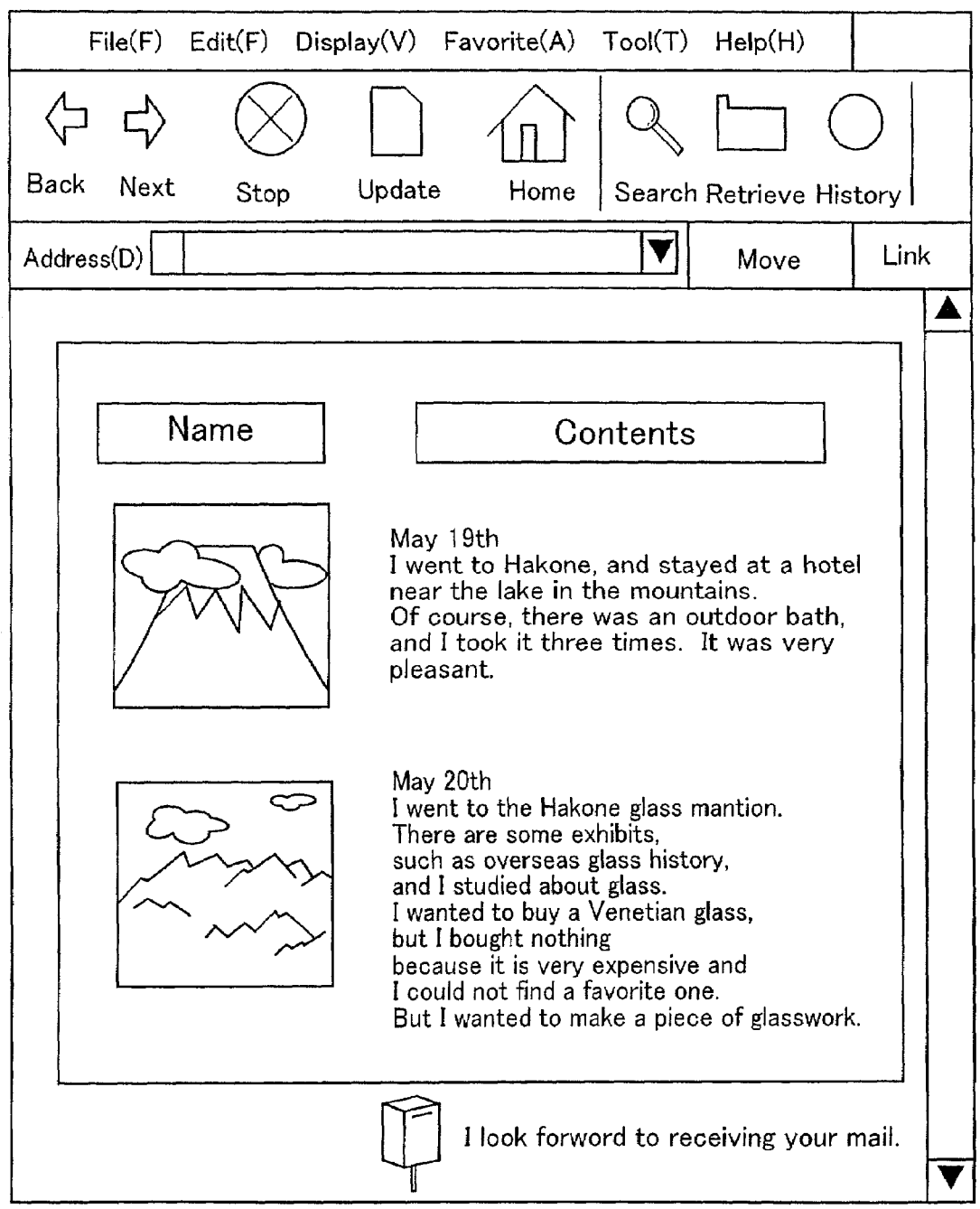
FIG. 11 illustrates a display of an existing homepage displayed by a browser software.
Figure 12:
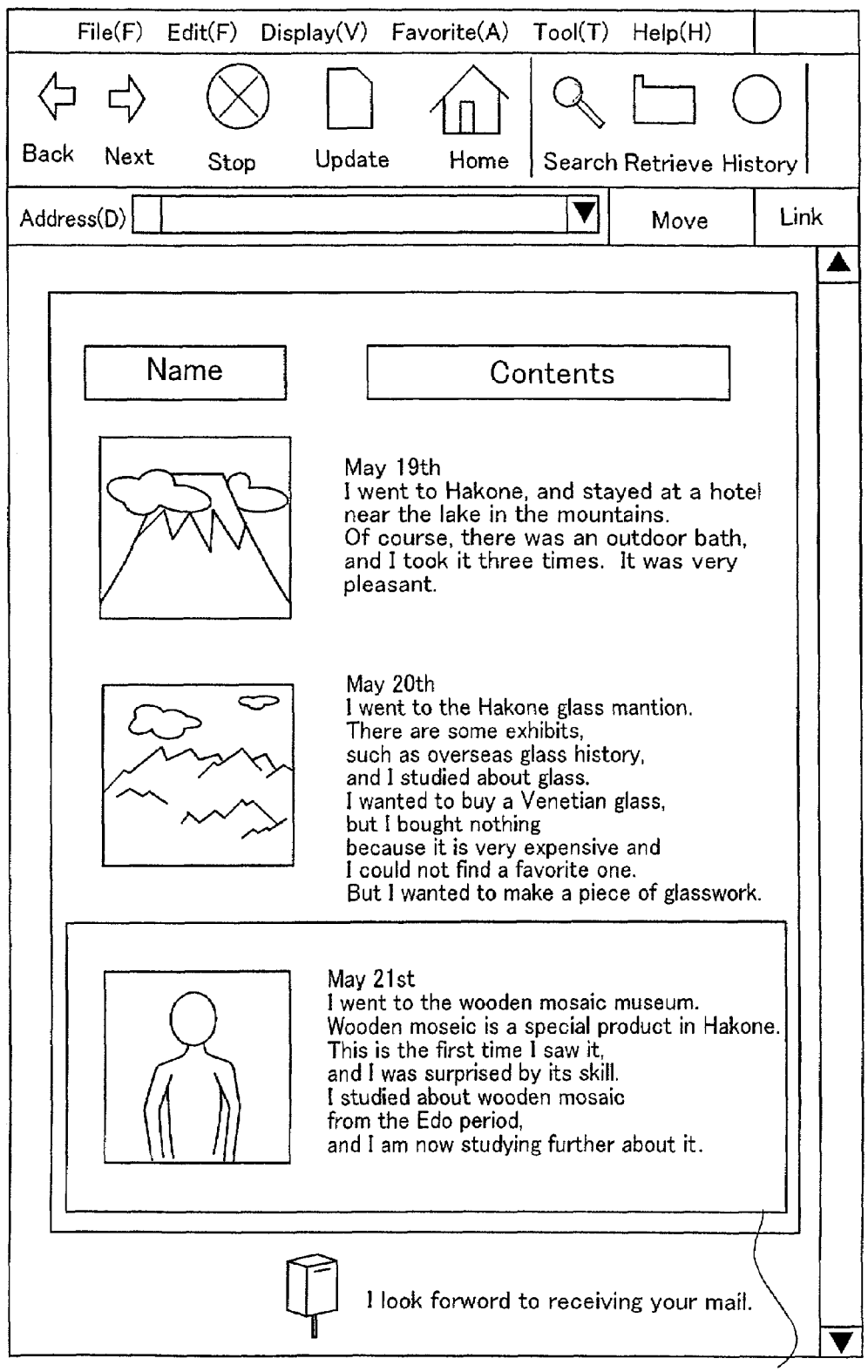
FIG. 12 illustrates a display of a homepage having an image and its comment added thereto.

FIG. 10 illustrates an exemplar description of the created homepage HTML file. In addition, FIG. 11 illustrates an exemplar display of the existing homepage displayed by browser software, and FIG. 12 illustrates an exemplar display of the homepage having an image on May 21 and its comment added thereto.

As described above, the homepage creation and update program according to the present invention have the functions of displaying plural stored images and allowing the user to select desired images, allowing the user to indicate beginning of the homepage creation process, and automatically creating or updating a homepage using the selected images after the user selects desired images and then indicates beginning of the homepage creation process. The homepage creation and update program causes a computer to execute these functions, so that the user only selects desired images and indicates homepage creation to acquire an automatically or semiautomatically created or updated homepage.

Furthermore, without knowledge of description of Javascript, HTML language, or the like, the user can easily create or update a homepage.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A computer-readable medium encoded with a homepage creation and update program of machine-readable instructions executable by a digital processing apparatus, which causes a plurality of image files to be displayed and allows a user to select a desired image and to indicate one of a homepage creation and a homepage update using the selected desired image, wherein the homepage creation and update program causes a computer to execute the functions of:

displaying a plurality of stored images and allowing the user to select one or more desired images;

allowing the user to indicate a beginning of a homepage creation process, including, if a new homepage is being created, allowing the user to select a layout format;

automatically performing the one of the creation and the update of a homepage using the desired image after the one or more desired images are selected and the beginning of the homepage creation process is indicated by the user; and, when the user selects a plurality of desired images and indicates the beginning of the homepage creation process, the selected images are sequentially presented individually in a predetermined order to said user to allow said user to add comments before a homepage format of said image is generated that will automatically place said image into said selected layout format, if a new homepage is being created, or into an existing homepage layout, if an existing homepage is being updated.

2. The computer-readable medium according to claim 1, wherein the sequential presentation of the desired images is based on an order that the user selects the plurality of desired images and indicates beginning of the homepage creation process, the selected plurality of images thereby being automatically sequentially presented to said user in one of an order of the user's selection and a reverse order of the user's selection.

3. The computer-readable medium according to claim 1, wherein the sequential presentation of the desired images is based on image information stored in each image file and said image information comprises at least one of an image width, an image height, an image direction, an image resolution, a trimming, and a zooming.

4. The computer-readable medium of claim 3, wherein said image information stored in each image file and used for said automatically arranging comprises incidental information that is transmitted by an electronic camera along with image data for an image.

5. The computer-readable medium according to claim 1, wherein the homepage creation and update program causes the computer to further execute the function of:

performing, when the user selects a plurality of desired images and indicates beginning of the homepage creation process, the one of the creation and the update of the homepage, which displays the images with photographing information stored in each image file, the photographing information concerning at least one of a date, a time, a photographer, a title, an image width, an image height, a compression mode of a stored image, a shutter speed, a contraction value, a brightness value, a light exposure correction value, a minimum stop-down value of lens, an object distance, a photometry method, flash emission conditions, a photographing location, a photographing direction, and comment information.

6. The computer-readable medium according to claim 1, wherein the homepage creation and update program causes the computer to further execute the functions of:

displaying, when the user selects the desired image and indicates the beginning of the homepage creation process, a screen editor homepage; and selecting an image on the screen editor homepage, and then moving the image location and changing the image size.

7. The computer-readable medium according to claim 1, wherein the homepage creation and update program causes the computer to further execute the function of:

automatically transmitting the homepage, which is one of created and updated by the homepage creation and update program, to a specified server.

8. The computer-readable medium according to claim 7, wherein the homepage creation and update program causes the computer to further execute the function of:

creating and updating an index part concerning the homepage transmitted to the specified server.

9. The computer-readable medium of claim 1, further comprising a menu bar comprising a menu selection button for entering into said automatically performing a creation/update of a homepage, wherein the automatic homepage creation/update comprises a transmission of the homepage creation/update in a format of a start-up command and a sequential listing of images.

10. The computer-readable medium of claim 9, further comprising a homepage creation menu including menu buttons to allow said user to select one of a new homepage creation process, an image addition process to an existing homepage, and a modification processing of an existing homepage.

11. The computer-readable medium of claim 1, further comprising a capability to move an image to a desired position during a homepage creation/update process.

12. The computer-readable medium of claim 1, wherein said computer transmits data of a homepage creation/update to a server accessible to said computer via an internet.

13. The computer-readable medium of claim 12, further comprising a menu bar having an upload button to at least one of store file data containing homepage contents into a storage device associated with said computer and upload said homepage contents to a server at a service center accessible to said computer via an internet.

14. The computer-readable medium of claim 1, further comprising an input port to which can be connected a cradle upon which to mount an electronic camera, such that, when said electronic camera is mounted on said cradle, said program automatically starts up an image viewer application so that images from said electronic camera can be viewed.

15. The computer-readable medium of claim 1, comprising one of:

a non-volatile memory on said computer;
a volatile memory on said computer; and
a storage disk insertable into said computer.

16. A computer program product encoded with a homepage creation and update program for use on an image viewer screen that displays a plurality of image files and uses of the plurality of image files and allows a user to select a desired image and a use of the selected desired image, wherein the homepage creation and update program causes a computer to execute the functions of:

displaying a plurality of stored images and allowing the user to select a desired image;

if a new homepage is to be generated, displaying a plurality of homepage layout formats and allowing the user to select a layout;

displaying a use of a homepage creation and allowing the user to indicate a beginning of a homepage creation process;

automatically performing one of a creation and an update of a homepage using the desired image after the desired image is selected and the beginning of the homepage creation process is indicated by the user; and when the user selects a plurality of desired images and indicates the beginning of the homepage creation process, the selected plurality of images are sequentially presented individually in an order to said user to allow said user to add comments before a homepage format of said image is generated that will automatically place said image into said selected layout format, if a new homepage is being created, or an existing homepage layout, if an existing homepage is being updated.

17. The computer program product according to claim 16, wherein, when the user selects a plurality of desired images and indicates the beginning of the homepage creation process, the selected plurality of images are automatically sequentially presented to the user in one of an order of the user's selection and a reverse order of the user's selection.

18. The computer program product according to claim 16, wherein the selected plurality of images are automatically sequentially presented to the user in an order based on image information stored in each image file, said image information comprising at least one of an image width, an image height, an image direction, an image resolution, a trimming, and a zooming.

19. The computer program product of claim 18, wherein said image information stored in each image file comprises incidental information that is transmitted by an electronic camera along with image data for an image.

20. The computer program product according to claim 16, wherein the homepage creation and update program causes the computer to further execute the function of:
performing, when the user selects a plurality of desired images and indicates the beginning of the homepage creation process, the one of the creation and the update of the homepage, which displays the images with photographing information stored in each image file, the photographing information concerning at least one of a date, a time, a photographer, a title, an image width, an image height, a compression mode of a stored image, a shutter speed, a contraction value, a brightness value, a light exposure correction value, a minimum stop-down value of lens, an object distance, a photometry method, flash emission conditions, a photographing location, a photographing direction, and comment information.

21. The computer program product according to claim 16, wherein the homepage creation and update program causes the computer to further execute the functions of:
displaying, when the user selects the desired image and indicates beginning of the homepage creation process, a screen editor homepage; and
selecting an image on the screen editor homepage, and then moving the image location and changing the image size.

22. The computer program product according to claim 16, wherein the homepage creation and update program causes the computer to further execute the function of:
automatically transmitting the homepage, which is one of created and updated by the homepage creation and update program, to a specified server.

23. The computer program product according to claim 22, wherein the homepage creation and update program causes the computer to further execute the function of:
creating and updating an index part concerning the homepage transmitted to the specified server.

24. A method of at least one of automatically creating and automatically updating a homepage, said method comprising:
allowing a user to select a homepage layout format, if a new homepage is to be generated;
allowing a user to display a plurality of stored images;
allowing the user to select one or more desired images from the plurality of stored images; and
automatically performing one of a creation and an update of a homepage, using the selected desired images after a beginning of the homepage creation process is indicated by the user, wherein the selected plurality of images are automatically presented sequentially to the user according to one of a sequence that the images are selected by the user and an order based on image information stored in each image file by a camera, to allow said user to add comments to the images, and
each said selected image is then automatically placed into a homepage format such as to be in said selected homepage layout format, if a new homepage is being generated, or in an existing homepage layout format, if said selected images are being added to an existing homepage.

25. The method according to claim 24, wherein said image information stored in each image file comprises incidental information that is transmitted by the camera along with image data for an image.

26. The method according to claim 24, wherein the image information stored in each image file comprises information stored in a tag of an Exchangeable Image File (EXIF) format.

27. The method according to claim 24, further comprising:
performing, when the user selects a plurality of desired images and indicates a beginning of the homepage creation process, the one of the creation and the update of the homepage, which initially displays the desired images along with photographing information stored in each image file, the photographing information concerning at least one of a date, a time, a photographer, a title, an image width, an image height, a compression mode of a stored image, a shutter speed, a contraction value, a brightness value, a light exposure correction value, a minimum stop-down value of lens, an object distance, a photometry method, flash emission conditions, a photographing location, a photographing direction, and comment information, and said image information used for automatically arranging said desired images comprises one or more of said photographing information, as selected by said user.

28. An apparatus, comprising:
a data input to connect to at least one of a camera and a memory device;
a display which permits image files to be displayed;
a user interface which allows a user to have image data displayed on said display, select one or more desired images, and to indicate one of a homepage creation and a homepage update using the selected desired images, including, if a new homepage is being created, allowing the user to select a layout format; and an output to permit a generated homepage or homepage update to be transmitted to a memory device to store said generated homepage or homepage update, wherein said apparatus automatically performs the selected one of the creation and the update of a homepage using the desired image after the one or more desired images are selected and a beginning of the homepage creation process is indicated by the user, and, when the user selects a plurality of desired images and indicates beginning of the homepage creation process, the selected images are sequentially presented individually in a predetermined order to said user to allow said user to add comments before a homepage format of said image is generated that will automatically place said image into said selected layout format, if a new homepage is being created, or into an existing homepage layout, if an existing homepage is being updated.

29. A system, comprising:

an apparatus in accordance with claim 28; and a server selectively interconnected to said apparatus to store said homepages received from said apparatus and to selectively transmit said homepages to viewers upon request.

30. The system of claim 29, further comprising:

a cradle upon which to mount an electronic camera, said cradle selectively connectable to said apparatus, such that, when said electronic camera is mounted on said cradle, said apparatus automatically starts up an image viewer application so that images from said electronic camera can be viewed.

* * * * *